UNITED STATES PATENT OFFICE.

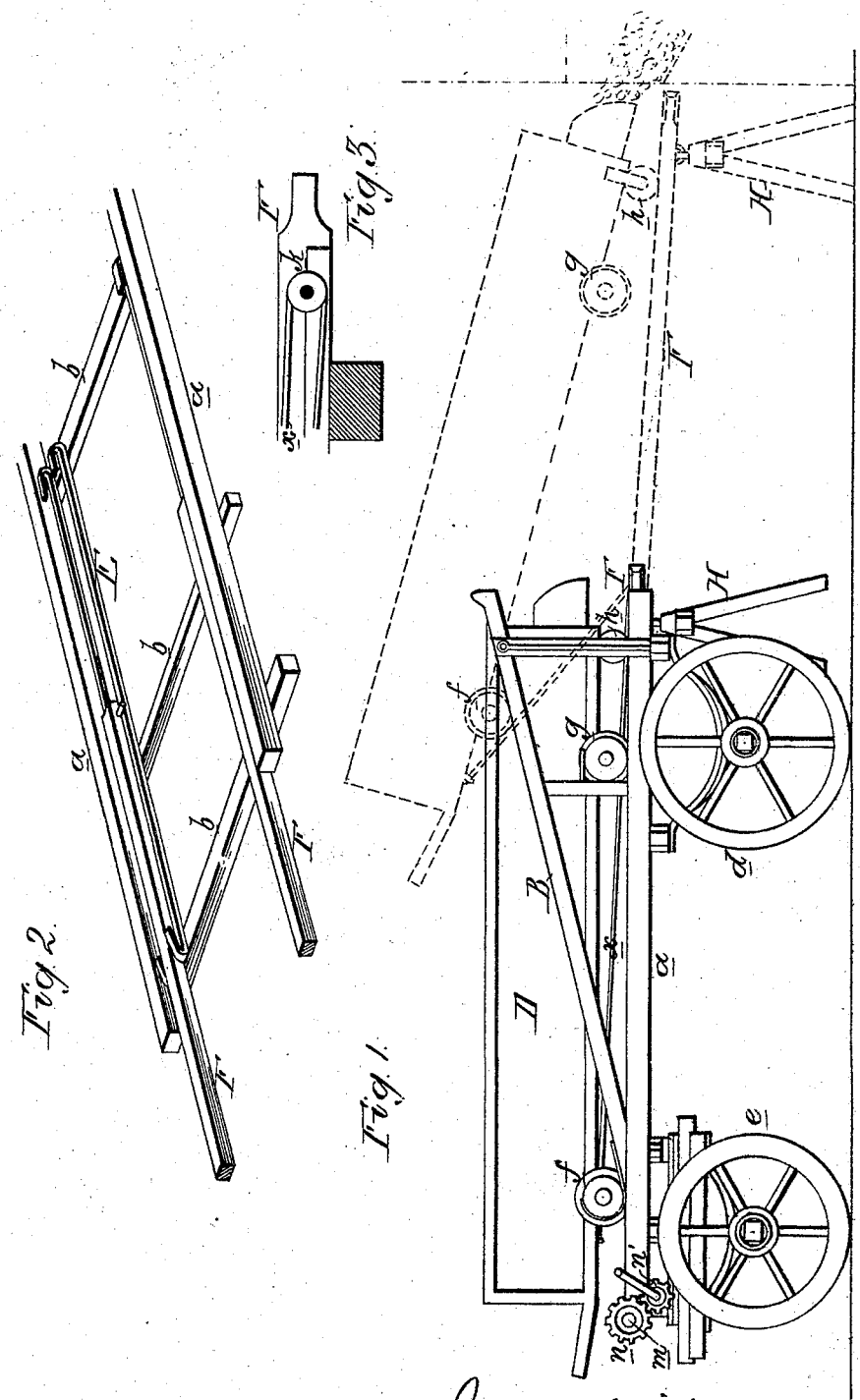

JAMES MILLS, OF WILMINGTON, DELAWARE, ASSIGNOR TO HIMSELF AND PHILIP COMBS, OF SAME PLACE.

IMPROVEMENT IN DUMPING-WAGONS.

Specification forming part of Letters Patent No. 171,156, dated December 14, 1875; application filed September 22, 1875.

*To all whom it may concern:*

Be it known that I, JAMES MILLS, of Wilmington, Delaware, have invented certain Improvements in Dumping-Wagons, of which the following is a specification:

My invention relates to an improvement in the dumping-wagon for which Letters Patent were granted to me on the 1st day of September, 1874; and the main object of my improvement is to so construct a wagon of this character that its contents can be discharged, when necessary, into an opening above the surface of the sidewalk. This object I attain in the manner which I will now proceed to describe, reference being had to the accompanying drawing, in which—

Figure 1 is a side view of my improved dumping-wagon, and Fig. 2 a perspective view of a portion of the truck-frame.

The frame of the wagon consists of the two side strips $a\ a$, connected together at intervals by transverse strips $b$, and this frame rests at the rear upon springs connected to the axle of the rear wheels $d$, and at the front upon the usual swinging truck carried by the axle of the front wheels $e$. To the top of each of the side strips $a$ of the frame is secured a strip, B, inclined upward from front to rear, and so arranged at the rear end that it can be either permanently secured in one position or adjusted to different angles. These inclined strips form ways for the passage of flanged or grooved wheels $f$ secured to the body D of the wagon, near the front end of the same, similar wheels $g$ near the rear of the body running upon the side strips $a$. The extreme rear end of the body D is also provided with wheels $h$ for a purpose explained hereafter. To the transverse bars $b$ of the frame adjacent to the inner edges of the side strips $a$ are secured ways E, each composed in the present instance of two parallel bars of wood or metal, between which slides and is guided one of the strips F, which form, when extended, tracks for the passage of the wheels $h$ of the body. The strips F are connected at or near the outer ends to a trestle, H, which, when the strips are moved in under the body of the wagon, hangs free from the ground; but when the strips are drawn out, as shown in dotted lines, rests upon the ground and supports the outer ends of said strips. The body of the wagon is moved rearward by the action of a cord or chain, $x$, connected to the body D near the front end, whence it passes around a pulley, $k$, placed near the rear of the frame of the wagon, as shown in the section, Fig. 3, and thence to a shaft $m$, at the front. This shaft is operated from a suitable crank-shaft through the medium of the gear-wheels $n$ and $n'$, Fig. 1.

When the load of the wagon is to be discharged into an opening at some distance above the sidewalk the strips F are first drawn out and their outer ends supported by the trestle H. The cord or chain $x$ is then wound round the shaft $m$, so as to cause the body to move rearward until it reaches the position shown by dotted lines in Fig. 1, the wheels $h$ running along the strips F and the wheels $f$ along the inclined strips B, so as to elevate the front end of the wagon and insure the complete discharge of the load. When the wagon is empty, but a slight effort is needed in order to return it to its normal position, owing to the inclination of the strips B.

When it is desired to discharge the contents of the wagon directly into an opening in the sidewalk, the trestle H is turned inward or detached, so as to allow the ends of the strips F to rest directly on the ground.

It will be evident that my improvement can be applied to two-wheeled carts, as well as to vehicles of the class illustrated and described, by simply providing a support for the rear end of the cart.

In some cases it may be found advisable to form the strips F, as well as the strips B, of iron tubing, guides of similar shape being used in place of the ways E, or the side strips being telescoped and the strips F caused to slide to and fro within the same.

I claim as my invention—

1. A dumping wagon or cart in which a movable body, D, mounted upon wheels or rollers, is combined with inclined strips B at the sides, and with strips F at the rear, all substantially as and for the purpose set forth.

2. The combination of the sliding strips F with ways E, secured to the frame of the wagon within the side strips *a*, and with supplementary rollers *h* secured to the under side of the wagon at the rear of the same, all as set forth.

3. The combination of the body D and its wheels or rollers, the inclined strips B, the strips F, and the trestle H.

In testimony whereof I have signed my name to this specification in the presence of two subscribing witnesses.

JAMES MILLS.

Witnesses:
S. S. SOUTHARD, Jr.,
E. B. FRAZEE.